US012566459B2

(12) United States Patent     (10) Patent No.: US 12,566,459 B2

Murata et al.     (45) Date of Patent: Mar. 3, 2026

(54) AUTOMATED CARRIER

(71) Applicant: TOYOTA JIDOSHA KABUSHIKI KAISHA, Toyota (JP)

(72) Inventors: Hiroto Murata, Toyota (JP); Kentaro Harada, Toyota (JP); Keigo Oishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 18/586,097

(22) Filed: Feb. 23, 2024

(65) Prior Publication Data

US 2024/0288882 A1    Aug. 29, 2024

(30) Foreign Application Priority Data

Feb. 28, 2023    (JP) .................................. 2023-029964

(51) Int. Cl.

| | |
|---|---|
| *G05D 1/672* | (2024.01) |
| *G05D 1/244* | (2024.01) |
| *G06V 20/56* | (2022.01) |
| *G05D 105/20* | (2024.01) |
| *G05D 105/28* | (2024.01) |
| *G05D 111/10* | (2024.01) |

(52) U.S. Cl.
CPC .............. *G05D 1/672* (2024.01); *G05D 1/244* (2024.01); *G05D 1/2446* (2024.01); *G06V 20/56* (2022.01); *G05D 2105/20* (2024.01); *G05D 2105/28* (2024.01); *G05D 2111/10* (2024.01)

(58) Field of Classification Search
None
See application file for complete search history.

(56) References Cited

U.S. PATENT DOCUMENTS

| | | | | |
|---|---|---|---|---|
| 5,803,502 A | * | 9/1998 | Noll ...................... | G01G 19/414 283/79 |
| 2021/0284233 A1 | * | 9/2021 | Katayama ............ | G05D 1/0212 |

FOREIGN PATENT DOCUMENTS

| | | | |
|---|---|---|---|
| JP | 2014-186680 A | | 10/2014 |
| JP | 2021-086205 A | | 6/2021 |
| JP | 2023164007 A | * | 11/2023 |
| WO | 2022/049743 A1 | | 3/2022 |

OTHER PUBLICATIONS

Translation of JP-2023164007-A (Year: 2023).*

* cited by examiner

*Primary Examiner* — Peter D Nolan
*Assistant Examiner* — Michael F Whalen
(74) *Attorney, Agent, or Firm* — Dinsmore & Shohl LLP

(57) ABSTRACT

An automated carrier includes a towing vehicle and a towed vehicle towed by the towing vehicle. The towed vehicle includes a marker associated with specification information of the towed vehicle stored in a computer mounted on the towing vehicle or in an external computer communicating with the towing vehicle. The towing vehicle includes a camera and a controller. The camera acquires a marker image by capturing an area comprising the marker on the towed vehicle. The controller acquires the specification information of the towed vehicle from the computer based on the marker image, and controls a drive unit of the towing vehicle based on the acquired specification information of the towed vehicle.

4 Claims, 13 Drawing Sheets

90

| Marker Image Information | Towed Vehicle ID | Weight | Number of vehicles to be towed (Number of single-vehicles) | wheel base | Caster Layout | Delivery Task | Cycle Time |
|---|---|---|---|---|---|---|---|
| ****** | 1 | 2.4 t | 2 | 2m | Front wheel:Freely Rear wheel :Fixed | ******** | T1 |
| ***** | 2 | 4.5 t | 3 | 4m | Front wheel:Fixed Rear wheel :Freely | ******** **** | T2 |
| ****** ** | 3 | 1.2t | 1 | 2m | Front wheel:Freely Rear wheel :Fixed | ******** ******** ** | T3 |
| ** | 4 | 1.5t | 1 | 4m | Front wheel:Fixed Rear wheel :Freely | ******** ** | T4 |
| . | . | . | . | . | . | . | . |

FIG. 4D

AUTOMATED CARRIER

CROSS REFERENCE TO RELATED APPLICATION

This application claims priority to Japanese Patent Application No. 2023-029964 filed on Feb. 28, 2023, which is incorporated herein by reference in its entirety including the specification, claims, drawings, and abstract.

TECHNICAL FIELD

The present disclosure relates to an automated carrier, and in particular to an automated carrier comprising a towing vehicle and a towed vehicle towed by the towing vehicle.

BACKGROUND

Automated carriers are used in factories and warehouses. The automated carrier comprises a towing vehicle and a towed vehicle. The towing vehicle tows the towed vehicle, which is loaded with cargo. The towing vehicle will automatically travel according to a predetermined travel route, etc., or according to a travel route, etc., as instructed by an external party via communication.

Patent Literature 1 (JP 2014-186680 A) discloses an automated carrier (equivalent to a towing vehicle) that can connect and transport a cart. This automated carrier comprises a laser range sensor that can measure the rear of its own machine, and detects one or both of the position or direction of the cart with the laser range sensor. Based on the measurement results of the laser range sensor, this automated carrier approaches a cart behind its own machine and couples the cart to it. And, based on the measurement results of the laser range sensor, this automated carrier may travel backward with the cart connected to it.

CITATION LIST

Patent Literature

PATENT LITERATURE 1: JP 2014-186680 A

SUMMARY

Towed vehicles come in a variety of forms, and their payloads can vary. Therefore, it is desirable for towing vehicle to be able to understand the characteristics of the towed vehicle it is towing and to be able to drive the vehicle according to the characteristics of the towed vehicle.

An object of the present disclosure is to enable a towing vehicle to drive the vehicle suitable for the towed vehicle being towed by the vehicle.

An automated carrier according to the present disclosure includes a towing vehicle and a towed vehicle towed by the towing vehicle. The towed vehicle includes a marker associated with specification information of the towed vehicle stored in a computer mounted on the towing vehicle or in an external computer communicating with the towing vehicle. The towing vehicle includes a camera and a controller. The camera acquires a marker image by capturing an area comprising the marker on the towed vehicle. The controller acquires the specification information of the towed vehicle from the computer based on the marker image, and controls a drive unit of the towing vehicle based on the acquired specification information of the towed vehicle.

In the automated carrier according to the present disclosure, the specification information of the towed vehicle may include at least one of the weight of the towed vehicle, the wheelbase of the towed vehicle, and whether caster wheels of the towed vehicle can be swiveled.

In the automated carrier according to the present disclosure, the marker of the towed vehicle may be associated with task information about a transport of the towed vehicle stored in the computer mounted on the towing vehicle or in the external computer communicating with the towing vehicle. The controller may acquire the task information for the towed vehicle from the computer based on the marker image. The controller may control the drive unit of the towing vehicle based on the acquired task information of the towed vehicle.

In the automated carrier according to the present disclosure, the automated carrier may include a coupling between the towing vehicle and the towed vehicle. The towing vehicle and the towed vehicle may be able to rotate about the coupling with respect to each other. The towing vehicle may include a marker. The camera may acquire a marker image by capturing an area which includes the markers of both the towing vehicle and the towed vehicle. The controller may acquire, based on a positional relationship between the markers of the towing vehicle and the towed vehicle in the marker image, a rotational direction and an angle of rotation between the towing vehicle and the towed vehicle in a rotation about the coupling. The controller may control the drive unit of the towing vehicle based on the acquired rotational direction and the acquired angle of rotation.

In the automated carrier according to the present disclosure, the towing vehicle may be separable from the towed vehicle. The towing vehicle may be configured to connect to the towed vehicle from a separated state from the towed vehicle by moving to the towed vehicle. The towing vehicle may include a marker. The camera may acquire a marker image by capturing an area comprising the markers of both the towing vehicle and the towed vehicle in the separated state. The controller may couple the towing vehicle to the towed vehicle by controlling the drive unit of the towing vehicle based on the positional relationship between the markers of the towing vehicle and the towed vehicle in the marker image.

According to the present disclosure, a towing vehicle can drive the vehicle suitable for a towed vehicle being towed by the vehicle.

BRIEF DESCRIPTION OF DRAWINGS

Embodiments of the present disclosure will be described based on the following figures, wherein:

FIG. 4D is an example of a marker database.

DESCRIPTION OF EMBODIMENTS

The embodiments of the present disclosure are described below based on the drawings. The present disclosure is not limited to the embodiments described herein. In all drawings, identical elements are marked with the same symbol and redundant explanations are omitted.

Figure 1:
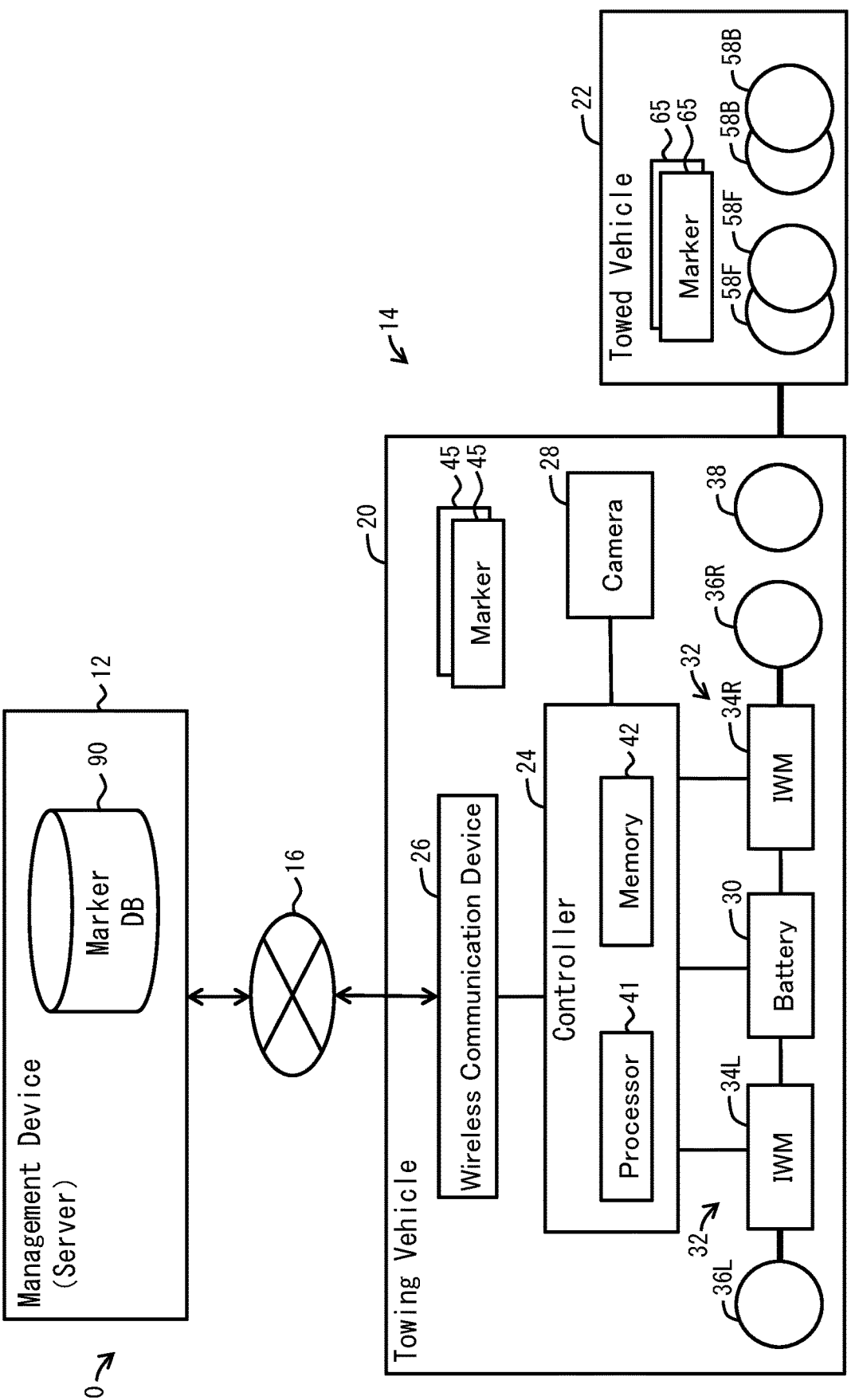
FIG. 1 is a functional block diagram of a carrying system 10.

FIG. 1 is a functional block diagram of a carrying system 10. The carrying system 10 comprises a management device 12 and an automated carriers 14. The management device 12 is constructed as a stand-alone server, for example, or as a system including multiple computers that are linked to each other, such as a cloud service. The management device 12 is a computer that stores and manages a marker database 90 (FIG. 4D, see below for details) comprising specification information (vehicle specifications) for each of the multiple towed vehicles 22.

The automated carrier 14 comprises towing vehicle 20 and towed vehicle 22 that is towed by towing vehicle 20. The towing vehicle 20 accesses an unshown access point via wireless communication to send and receive data to and from the management device 12 via the communication line 16. The communication line 16 may be configured in the form of an Internet or an Intranet or the like.

Figure 2A:
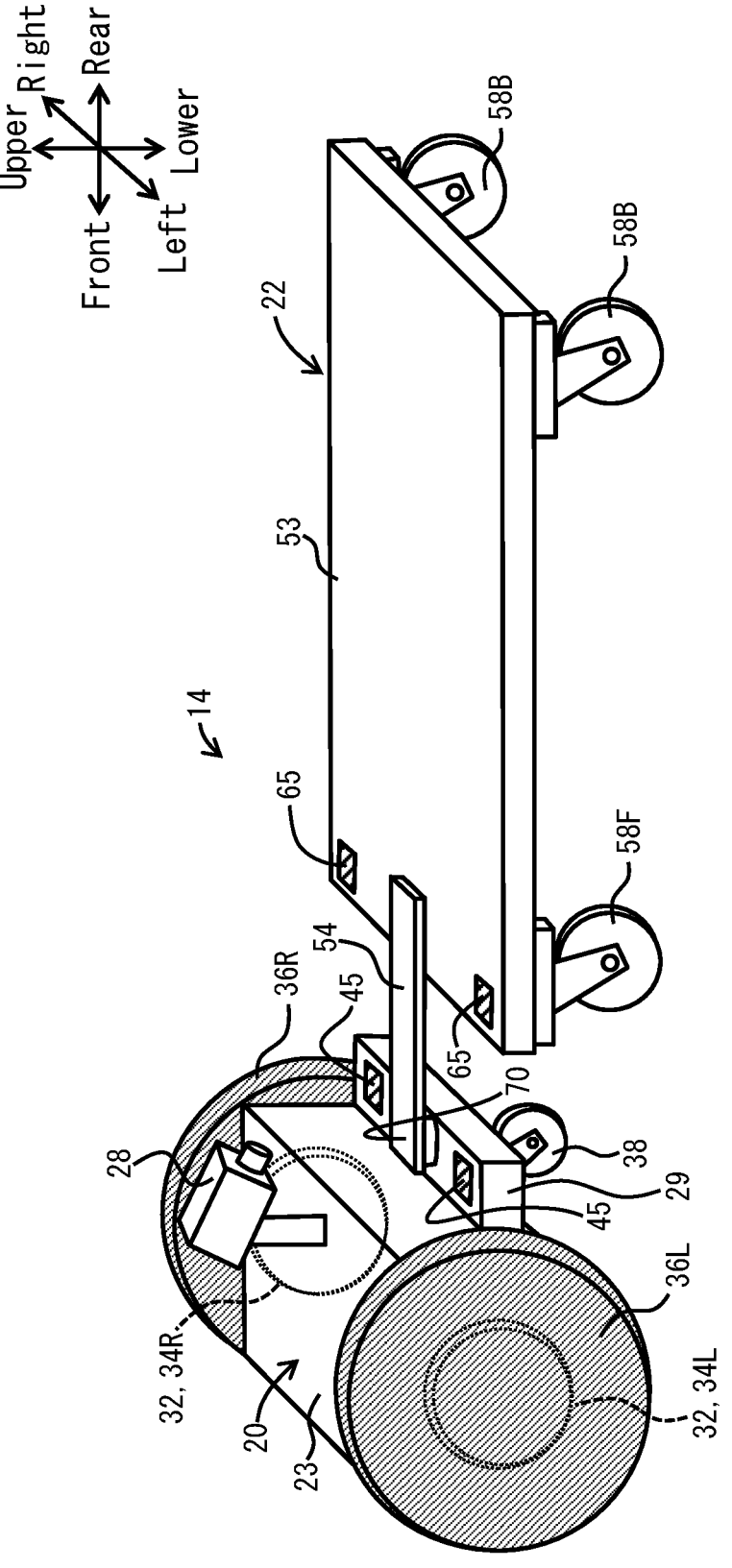
FIG. 2A is a diagram of an automated carrier 14.
Figure 2B:
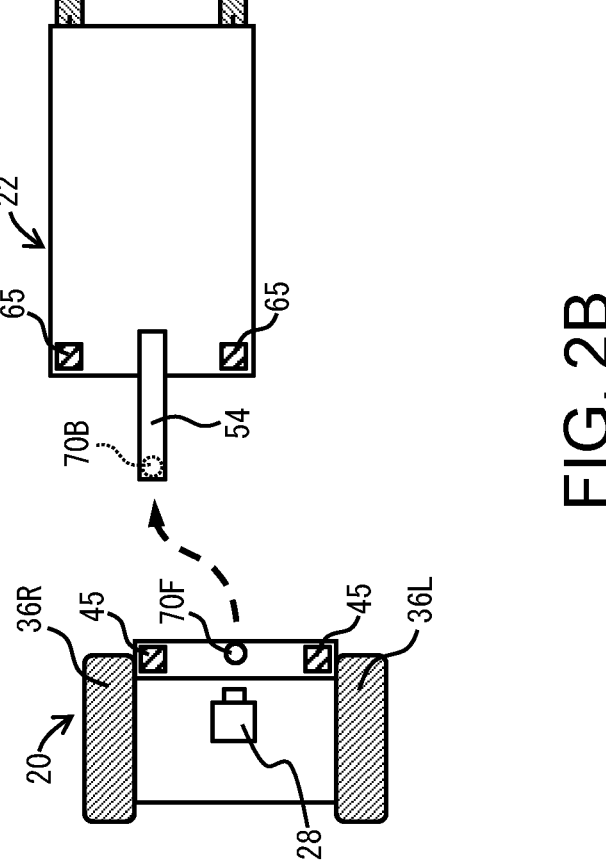
FIG. 2B is an illustration of coupling operation that couples a towing vehicle 20 with a towed vehicle 22.

FIG. 2A is a diagram of the automated carrier 14. The towing vehicle 20 and the towed vehicle 22 are connected by a coupling 70. As shown in FIG. 2B, the coupling 70 includes a coupling element 70F on the towing vehicle 20 side and a coupling element 70B on the towed vehicle 22 side. In each figures, the coupling 70 (coupling elements 70F, 70B) is depicted in a simplified manner. For example, a well-known technology such as a hitch member can be employed as the coupling 70.

Figure 2C:
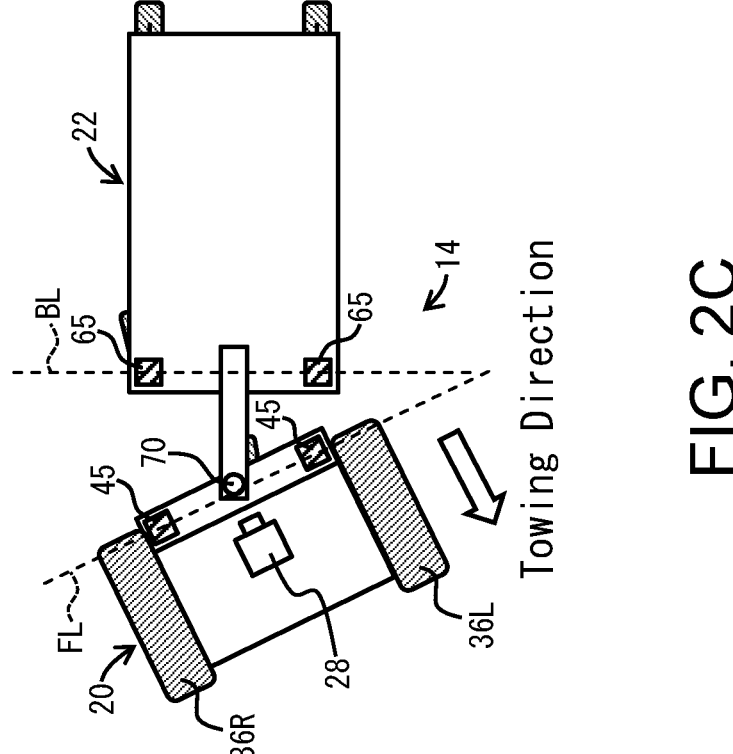
FIG. 2C is an illustration of rotation at a coupling 70 in a towing vehicle 20 and a towed vehicle 22.

The towing vehicle 20 can separate from the towed vehicle 22 and run alone, as shown in FIG. 2B, and can be coupled to various towed vehicles 22 of different forms. The towing vehicle 20 and the towed vehicle 22 in the coupled state can rotate with respect to one of them about the coupling 70, as shown in FIG. 2C.

As shown in FIG. 2A, the towing vehicle 20 comprises a body 23, two drive wheels 36L, 36R, one caster 38, a camera 28, and two markers 45.

The body 23 has an approximately rectangular shape, and its rear portion is lowered one step lower than its front portion to form a step portion 29. At the left and right centers of the step section 29, there is the coupling 70 with the towing vehicle 22. Markers 45 are provided on each of the left and right sides of the step section 29 (see FIG. 2A); the two markers 45 are captured by the camera 28 and used to estimate the position of the towed vehicle 22 relative to the towing vehicle 20.

The two drive wheels 36L, 36R are located on the left and right outer sides of the body 23. Inside each of the two drive wheels 36L, 36R, in-wheel motors 34L, 34R are located as a drive source of the towing vehicle 20. The in-wheel motors 34L, 34R generate driving force to the drive wheels 36L,

36R, respectively. The in-wheel motors 34L, 34R are examples of drive unit 32 of the towing vehicle 20.

The caster 38 is a freely caster in which the direction of the wheel can be changed. The caster 38 is attached to the underside of the body 23 and is located behind the body and centered on the left and right sides.

The camera 28 is positioned and fixed to the upper side of body 23. The camera 28 faces behind and below the towing vehicle 20 and captures images of the markers 45 on the towing vehicle 20 and the markers 65 on the towed vehicle 22.

As shown in FIG. 1, the towing vehicle 20 comprises a controller 24, a battery 30, and a wireless communication device 26. These are located, for example, inside the body 23 (see FIG. 2A).

The controller 24 is a device that controls the in-wheel motors 34L, 34R. The controller 24 comprises a microcomputer. The controller 24 comprises a processor 41, such as a CPU, memory 42, and an input/output interface (not shown). The memory 42 is RAM (random access memory), ROM (read-only memory), non-volatile storage (e.g., flash memory, hard disk), etc. The processor 41 realizes various controls and various functions by using RAM and processing according to programs and data stored in the ROM and nonvolatile memory devices in advance. The controller 24 may comprise multiple computers that are integrated or physically separated from each other.

The controller 24 is electrically connected to the wireless communication device 26, the camera 28, the battery 30, and two in-wheel motors 34L, 34R.

The wireless communication device 26 is a communication device that accesses an access point (not shown) via wireless communication and connects to the communication line 16. The wireless communication device 26 communicates with the management device 12 via the communication line 16 to send and receive data to and from the management device 12. Accordingly, the controller 24 communicates with the management device 12 via the wireless communication device 26 and the communication line 16 to send and receive data to and from the management device 12. The battery 30 provides power to the two in-wheel motors 34L, 34R.

Figure 6A:
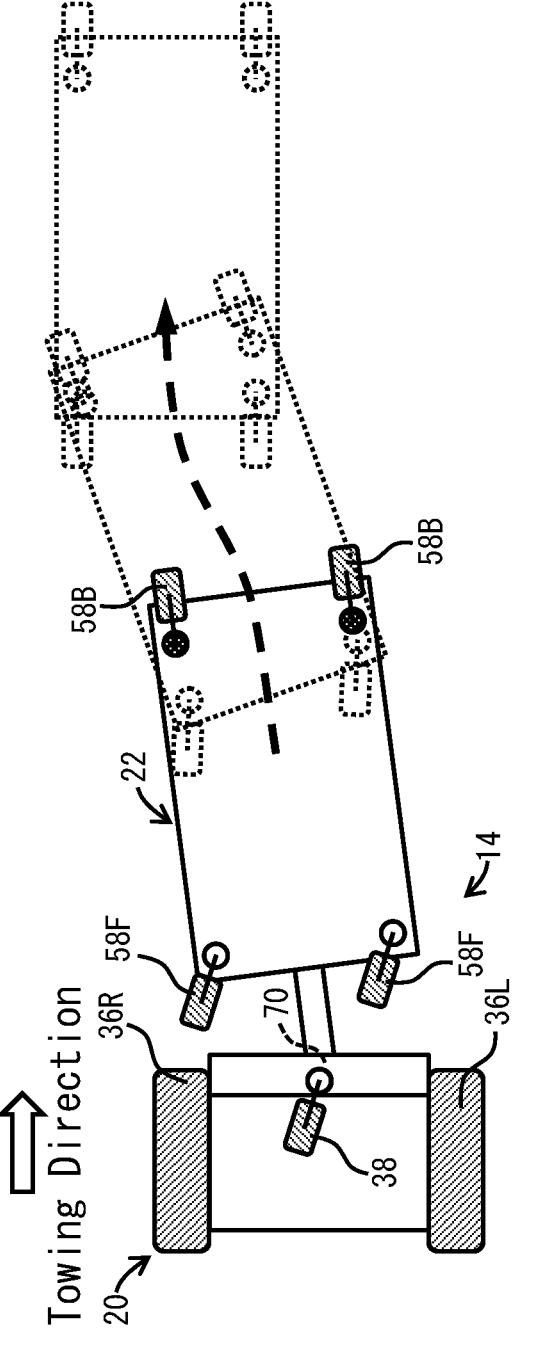
FIG. 6A is an illustration showing a backward movement of an automated carrier 14.

The rotational speeds of the left side drive wheel 36L and the right side drive wheel 36R can be independently controlled by the in-wheel motors 34L and 34R, respectively. For example, if the number of revolutions per unit time of the left side drive wheel 36L and the right side drive wheel 36R is the same, the towing vehicle 20 will go straight. If the number of revolutions per unit time of the left drive wheel 36L is greater than the number of revolutions per unit time of the right drive wheel 36R, the towing vehicle 20 turns to the right. On the other hand, if the number of revolutions per unit time of the right drive wheel 36R is greater than the number of revolutions per unit time of the left drive wheel 36L, the towing vehicle 20 turns to the left. The towing vehicle 20 can go straight and turn not only forward but also backward (see FIG. 6A). When the towing vehicle 20 is traveling alone, if the direction of rotation of the left side drive wheel 36L and the right side drive wheel 36R in the towing vehicle 20 are reversed, the towing vehicle 20 turns in place.

As another embodiment, the drive unit 32 of the towing vehicle 20 may not be an in-wheel motor, but may be a motor or the like mounted within the body 23 and configured to drive the drive wheels 36L, 36R. The drive unit 32 of the towing vehicle 20 may comprise mechanisms and components other than a drive source.

The towing vehicle 20 performs automatic driving alone or with a towed vehicle 22. For automatic driving, the towing vehicle 20 may comprise sensors (not shown) that detect objects in front of or around towing vehicle 20, and may store information necessary for driving, such as map information, in memory 42 in advance. The towing vehicle 20 may also receive the information necessary for traveling from an external device such as the management system 12. The known technologies may be employed to automatically operate the towing vehicle 20.

The towed vehicle 22 comprises a main body 53, two casters 58F as front wheels (only one is shown in FIG. 2A), two casters 58B as rear wheels, and two markers 65. The main body 53 has a flat plate shape and can be loaded with cargo on the upper side. The main body 53 in each figures is depicted in simplified form, and the main body 53 may be provided with necessary components such as a fixing member for luggage and a fence.

The two casters 58F (front wheels, see FIG. 5A) are freely casters whose wheels can change direction. The two casters 58F are located in front of and on either side of the body 53 and are attached to the underside of the body 53.

The two casters 58B (rear wheels) are fixed casters whose wheels can not change direction. The two casters 58B are located behind and on either side of the body 53 and are attached to the underside of the body 53.

As shown in FIG. 2A, the two markers 65 are located on the top surface of the body 53, in front of and on either side of the body 53. The two markers 65 are captured by the camera 28 and used to estimate the position of the towed vehicle 22 relative to the towing vehicle 20. One of the two markers 65 is an information acquisition marker that is associated with the specification information of the towed vehicle 22 stored in the management device 12 (marker database 90, see FIG. 4D). The marker for acquiring information are sometimes referred to as AR marker. Each of the multiple towed vehicles has a different marker for acquiring information from each other.

For example, inertial sensors and laser range sensors can be used to measure the positional relationship between the towing vehicle and the towed vehicle. However, inertial sensors need to be attached to both the towing vehicle and the towed vehicle, which increases the number of sensors and requires power to be supplied to each inertial sensor. In addition, laser range sensors require the towed vehicle (cart) to be within the laser irradiation range, and may not be able to detect the position and orientation of the towed vehicle depending on the shape and loading conditions of the towed vehicle. However, if markers 45 and 65 are used as in this embodiment, the positional relationship between the towing vehicle 20 and the towed vehicle 22 can be obtained without a sensor and without power supply.

The towed vehicle 22 comprises an arm 54 that extends forward of the vehicle. The arm 54 is connected to the body 53 of the towed vehicle 22 in the front, left and right center. The end of the arm 54 has a connecting element 70B (see FIG. 2B) and is connected to the towing vehicle 20.

The towing vehicle 22 may include a plurality of vehicles strung together in the front-back direction. In this case, the towing vehicle described above is referred to as a single-vehicle. A plurality of single-vehicles are coupled together in the front-back direction to form a coupled vehicle. Such a coupled vehicle comprising two or more single-vehicles is also referred to herein as a towed vehicle 22. In this case, in order to connect another single-vehicle to the rear of the single-vehicle, a vehicle coupling similar to the coupling 70 is provided at the rear end and in the center of the left and right sides of the single-vehicle.

The management device 12 (see FIG. 1) includes, for example, a processor, a memory (main memory) such as random access memory (RAM), a controller that controls auxiliary memory devices, interfaces to various input/output devices, and a network interface that controls for connection to a network. In the management device 12, these components are connected via a data transmission path, such as a bus, for example. The auxiliary storage device is a nonvolatile storage device such as flash memory, SSD (solid state drive), HDD (hard disk drive), etc. A program describing the processing contents is installed in the management device 12 (computer) via a network, etc., and stored in an auxiliary memory device. The program stored in the auxiliary storage device is executed by the processor using the memory, thereby constituting the management device 12 in this embodiment.

The management device 12 stores the marker database 90 (see FIG. 4D) in a nonvolatile storage device. The marker database 90 is formed by an information processing device (not shown) such as a personal computer (PC) operated by an operator, which inputs information on a plurality of towed vehicles 22 to the management device 12 via the communication line 16. The marker database 90 includes a plurality of records (rows), as shown in FIG. 4D, with each record representing the information of one towed vehicle.

One record includes marker image information, towed vehicle ID, weight, number of vehicles to be towed (number of single-vehicles), wheelbase, caster layout, delivery task, and cycle time. The marker image information is the image information of marker 65 (marker for information acquisition, see FIG. 2A) of the towed vehicle 22. The towing vehicle ID is identification information of the towed vehicle 22. The weight is the overall weight of the towed vehicle 22. The number of vehicles to be towed is the number of single-vehicles comprised in the towed vehicle 22. Wheelbase is the distance between the front and rear wheels in each single-vehicle. Caster layout is information indicating whether the 58F front wheel casters and 58B rear wheel casters in each single-vehicle are freely casters or fixed casters. The delivery task is information that indicates the destination to which the towed vehicle 22 is to be transported, and the transit points along the driving route to the destination. The cycle time is the specified transport time (processing time) for having the vehicle 22 transported to the destination.

The weight, number of vehicles to be towed, wheelbase, and caster layout in marker database 90 are examples of specification information (vehicle specifications) for towed vehicles. The delivery task and cycle time are examples of task information related to transportation.

The process using the marker database 90 is described here. When a towing vehicle 20 traveling alone approaches or is coupled to a towed vehicle 22, it acquires a marker image by capturing an area comprising marker 65 (marker for acquiring information) of the towed vehicle 22 with a camera 28. The towing vehicle 20 transmits the marker 65 in the marker image to the management device 12, which receives it. The management device 12 uses the marker database 90 to obtain the towed vehicle ID, weight, number of vehicles to be towed, wheelbase, caster layout, delivery task, and cycle time of the towed vehicle associated with the received marker (marker image information), and sends such information to the towing vehicle 20. The towing vehicle 20 receives those information from the management device 12. The controller 24 of the towing vehicle 20 controls the drive unit 32 (in-wheel motors 34L, 34R) based on the weight, number of vehicles to be towed, wheelbase, caster layout, delivery task, and cycle time received, to drive the towing vehicle 20.

As a form of using the marker database 90, it is possible to download the entire or a part of the marker database 90 from the management device 12 to the controller 24 (computer) of the towing vehicle 20 in advance. Then, when marker images are acquired, the marker database 90 stored in the controller 24 is used.

Figure 3:
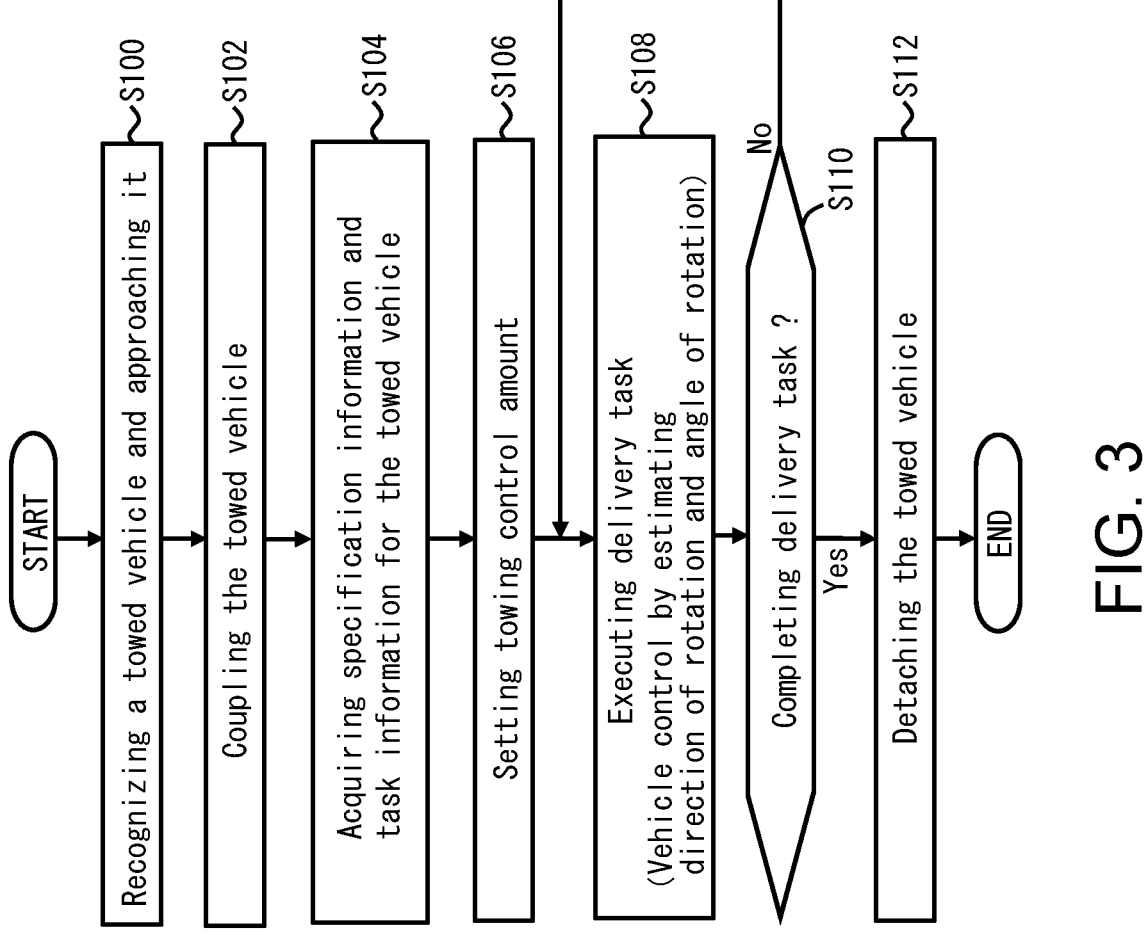
FIG. 3 is a flowchart showing process performed by a towing vehicle 20.

The specific operations of the automated carrier 14 are described here. FIG. 3 is a flowchart showing the process performed by the towing vehicle 20. The towing vehicle 20 is separated from the towed vehicle 22 in the pre-processing stage.

Figures 4A, 4B, 4C:
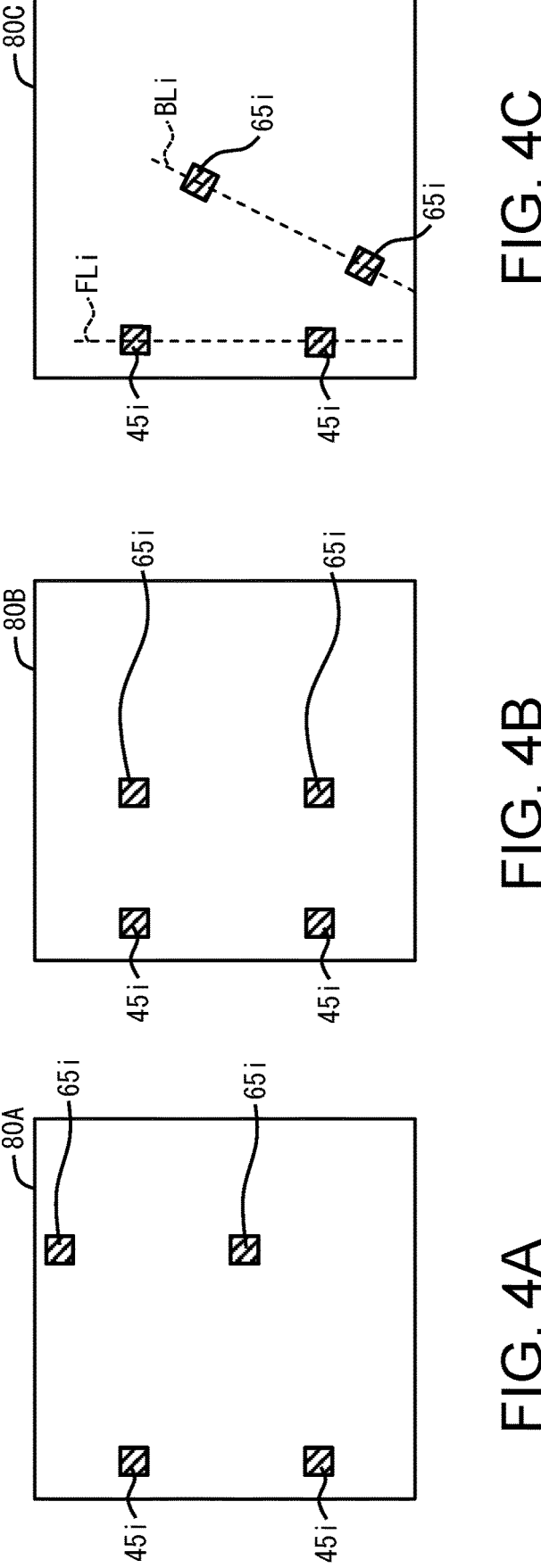
FIG. 4A is an example of an image captured by a camera.
FIG. 4B is an example of an image captured by a camera.
FIG. 4C is an example of an image captured by a camera.

In S100, the towing vehicle 20 recognizes the towed vehicle 22 and approaches the towed vehicle 22 while backing away, as shown in FIG. 2B. Specifically, the towing vehicle 20 acquires a marker image by capturing an area comprising the markers 45, 65 of both the towing vehicle 20 and the towed vehicle 22 in the separated state by the camera 28. FIG. 4A shows an example of the marker image 80A in this case. The marker image 80A includes markers 45i of the towing vehicle's markers 45 and markers 65i of the towed vehicle's markers 65. The controller 24 of the towing vehicle 20, while continuing to capture images with the camera 28, controls the drive unit 32 so that the relative positions of the markers 45i and 65i in the marker image 80A become their relative positions when the towing vehicle 20 and the towed vehicle 22 are connected (see FIG. 4B, target position relationship). The controller 24 of the towing vehicle 20 may store information (e.g., the marker image 80B itself shown in FIG. 4B) indicating the target positional relationship in advance.

This allows the towing vehicle 20 to travel backward and approach the towed vehicle 22. The towing vehicle 20 can then connect the towed vehicle 22 (S102 in FIG. 3).

When the towing vehicle 20 traveling alone has one or more towed vehicles 22 around it, the identification information (towed vehicle ID) of each towed vehicle 22 can be obtained from the marker database 90 by capturing the marker 65 (marker for information acquisition) of each towed vehicle 22 with the camera 28. Therefore, the towing vehicle 20 can identify the towed vehicle to be connected, approach it, and connect it.

Next, at S104 in FIG. 3, the towing vehicle 20 obtains specification information (vehicle specifications) and task information of the towed vehicle 22 from the marker database 90 by capturing image of the marker 65 (marker for obtaining information) of the coupled towed vehicle 22 with the camera 28.

Then, at S106, the controller 24 of the towing vehicle 20 sets the towing control amount based on the specification information (weight, number of vehicles to be towed, wheelbase, caster layout) of the towed vehicle 22 obtained at S104.

Specifically, the towing torque of the towing vehicle 20 is set based on the weight of the towed vehicle 22. For example, if the weight of the towed vehicle 22 is greater, the towing torque of the towing vehicle 20 is increased compared to when it is smaller.

The turning radius and speed of the towing vehicle 20 are set based on the number of vehicles to be towed (number of single-vehicles). For example, if the number of vehicles to be towed is large, the turning radius of the towing vehicle 20 should be larger than if the number of vehicles to be towed is small. When the number of vehicles to be towed is greater, the speed of the towing vehicle 20 is set lower than when the number of vehicles to be towed is less. When turning at a high vehicle speed, especially when the number of vehicles to be towed is large, the travel track of each vehicle may bulge outward due to lateral acceleration, so the vehicle speed of towing vehicle 20 is suppressed to prevent bulging.

Figure 5A:
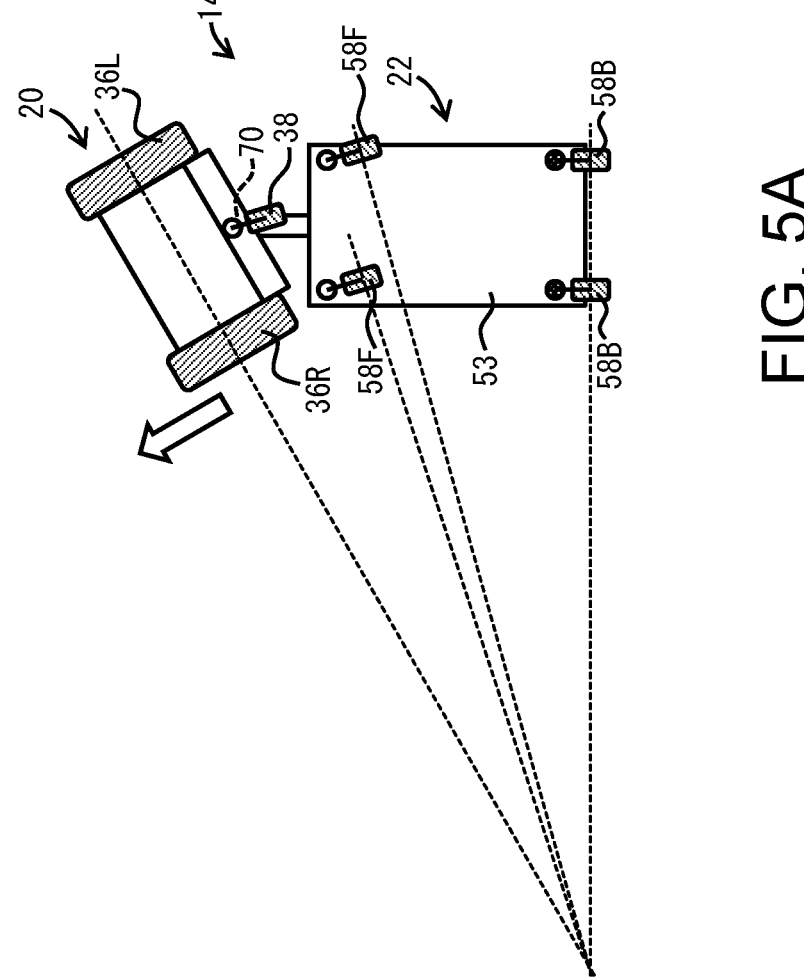
FIG. 5A is an illustration showing a turning radius of an automated carrier.
Figure 5B:
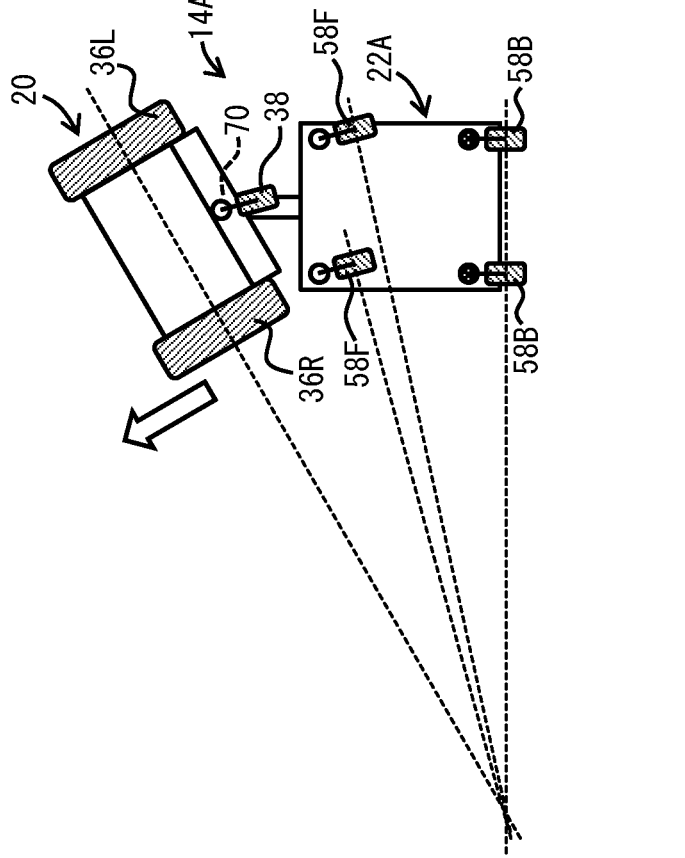
FIG. 5B is an illustration showing a turning radius of an automated carrier.

The turning radius of the towing vehicle 20 is based on the wheelbase of the towed vehicle 22. FIG. 5A shows the automated carrier 14 described with FIG. 2A. FIG. 5B shows the automated carrier 14A with a towing vehicle 22A different from the towed vehicle 22 of the automated carrier 14 of FIG. 5A. The towing vehicle 22A in FIG. 5B has a shorter wheelbase than the towed vehicle 22 in FIG. 5A. As shown in these figures, the minimum turning radius of the towing vehicle 20 needs to be controlled because the minimum turning radius is different due to the different wheelbase lengths of the towed vehicles 22 and 22A. For example, when the towed vehicle has a longer wheelbase, the turning radius of the towing vehicle 20 should be larger than when it is shorter.

Figure 5C:
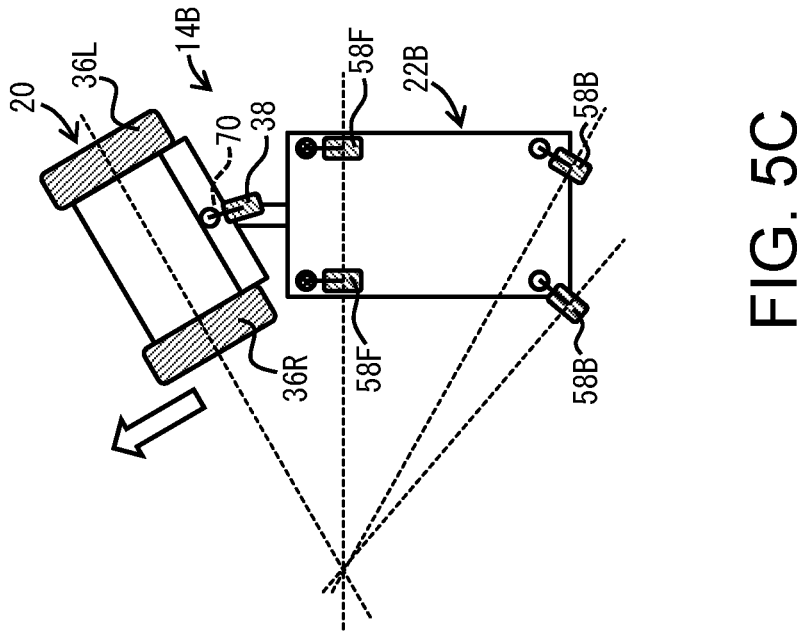
FIG. 5C is an illustration showing a turning radius of an automated carrier.

The turning radius of the towing vehicle 20 is set based on the caster layout of the towed vehicle 22. FIG. 5C shows an automated carrier 14B with a towed vehicle 22B that is different from the towed vehicle 22 in FIG. 5A. The towed vehicle 22 in FIG. 5A has casters 58 on the front wheels that are freely casters and casters 58B on the rear wheels that are fixed casters. On the other hand, the towing vehicle 22B in FIG. 5C has casters 58F on the front wheels that are fixed casters and casters 58B on the rear wheels that are freely casters. As shown in these figures, the minimum turning radius of the towing vehicle 20 needs to be controlled because the minimum turning radius differs due to the different caster layouts of the towed vehicles 22 and 22B. For example, when the front wheels have freely casters and the rear wheels have fixed casters (FIG. 5A), the turning radius of the towing vehicle 20 is larger than when the front wheels have fixed casters and the rear wheels have freely casters (FIG. 5C).

The speed of the towing vehicle 20 is set based on the cycle time (processing time). For example, if the cycle time is long, the speed of the towing vehicle 20 might be slower than if it is short.

The setting of the towing control amount in S106 is to set the general or schematic driving control trend of the towing vehicle 20. The controller 24 of the towing vehicle 20 flexibly changes the towing control amount when traveling the towing vehicle 20, depending on the towing control amount set in S106 and the traveling environment (road slope, road width, presence of obstacles, etc.).

Next, in S108, the towing vehicle 20 executes the delivery task. The controller 24 of the towing vehicle 20 controls the drive unit 32 based on the task information (delivery task, cycle time) obtained in S104. The controller 24 of the towing vehicle 20 also controls the drive unit 32 based on the towing control amount set in S106. This continues until the delivery task is completed (S110: Yes).

The control of the towing vehicle 20 during the execution of the delivery task is described here. As shown in FIG. 2C, when the towing vehicle 20 turns, etc., the towing vehicle 20 and the towed vehicle 22 can rotate with respect to one of them around coupling 70. Here, the direction of rotation (direction of folding) and the angle of rotation (angle of folding) in rotation around the coupling 70 are defined. In this embodiment, the direction of rotation is defined as the direction in which the towed vehicle 22 tilts with respect to the towing vehicle 20, and the angle of rotation is defined as the angle of the towed vehicle 22 with respect to the towing vehicle 20. In other embodiments, the direction of rotation may be defined as the direction in which the towing vehicle 20 tilts with respect to the towed vehicle 22, and the angle of rotation may be defined as the angle of the towing vehicle 20 with respect to the towed vehicle 22.

In this embodiment, the direction of inclination of the line BL connecting the two markers 65 of the towed vehicle 22 relative to the line FL connecting the two markers 45 of the towing vehicle 20 indicates the direction of rotation. The angle at which line BL is inclined relative to line FL (the angle formed by line FL and line BL) indicates the angle of rotation.

The markers 45 of the towing vehicle 20 and the markers 65 of the towed vehicle 22 are captured by camera 28, so that a marker image 80C is obtained as shown in FIG. 4C. In the marker image 80C, markers 45i corresponding to markers 45 and markers 65i corresponding to markers 65 appear. The controller 24 of the towing vehicle 20 can figure out the line FLi connecting the two markers 45i and the line BLi connecting the two markers 65i from the marker image 80C. Thus, the controller 24 of the towing vehicle 20 can recognize the direction of rotation and angle of rotation at the towing vehicle 20 and the towed vehicle 22.

During the execution of the delivery task, the controller 24 of the towing vehicle 20 obtains the direction and angle of rotation in the towing vehicle 20 and the towed vehicle 22 based on the marker image, and controls the two drive wheels 36L, 36R based on the obtained direction and angle of rotation.

For example, when the automated carrier 14 moves forward or backward (see FIG. 6A), the automated carrier 14 may deviate from the target travel path. This can be caused, for example, by the drive wheels 36L, 36R of the automated carrier 14 slipping, the casters being bent in the direction at the start of travel, or the automated carrier 14 traveling on a slope. When the automated carrier 14 deviates from the target travel path during the backward movement shown in FIG. 6A, it becomes difficult to move the towed vehicle 22 to the desired position. Therefore, the controller 24 of the towing vehicle 20 acquires the direction and angle of rotation in the towing vehicle 20 and the towed vehicle 22, and controls the two drive wheels 36L and 36R to compensate for the deviation of the direction and angle of rotation from the target.

The phenomenon in which the towing vehicle 20 and the towed vehicle 22 fold unintentionally around the coupling 70 is called the jackknife phenomenon. The above control is to suppress the occurrence of the jackknife phenomenon or to eliminate it when it occurs.

Figure 6B:
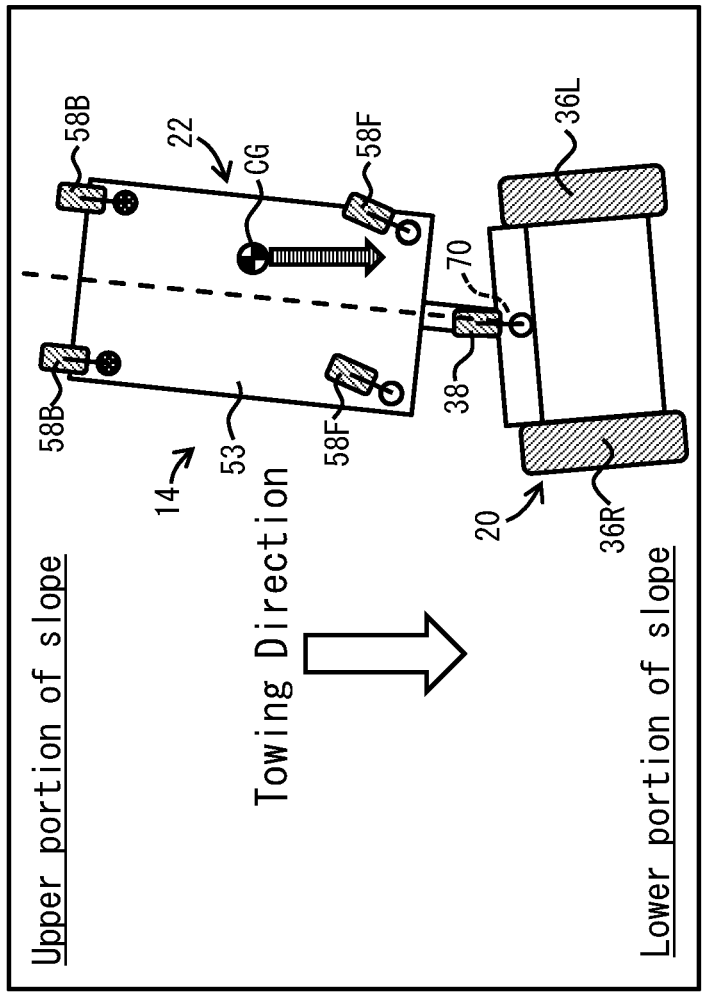
FIG. 6B is an illustration showing a jackknife phenomenon of an automated carrier 14 on a slope.

For example, as shown in FIG. 6B, when the automated carrier 14 is going down a slope, if the center of gravity CG of the towed vehicle 22 is off the center axis of the vehicle (indicated by the dashed line in FIG. 6B), a jackknife phenomenon will occur due to a rotational moment about the coupling 70. Therefore, as shown in FIG. 6B, when the towed vehicle 22 is tilted to the right (left in the vehicle) with respect to the towing vehicle 20, the controller 24 of the towing vehicle 20 eliminates the jackknife phenomenon by slightly increasing the speed or torque of the left drive wheel 36L than the speed or torque of the right drive wheel 36R. On the other hand, if the towed vehicle 22 is tilted to the left (right in the vehicle) with respect to the towing vehicle 20, the controller 24 increases the speed or torque of the right side drive wheel 36R slightly than the speed or torque of the left side drive wheel 36L. This suppresses a folding of the automated carrier 14, which obstructs the travel of the automated carrier 14. This allows the automated carrier 14 to travel in a straight line and improves the driving stability of the automated carrier 14.

Figure 6C:
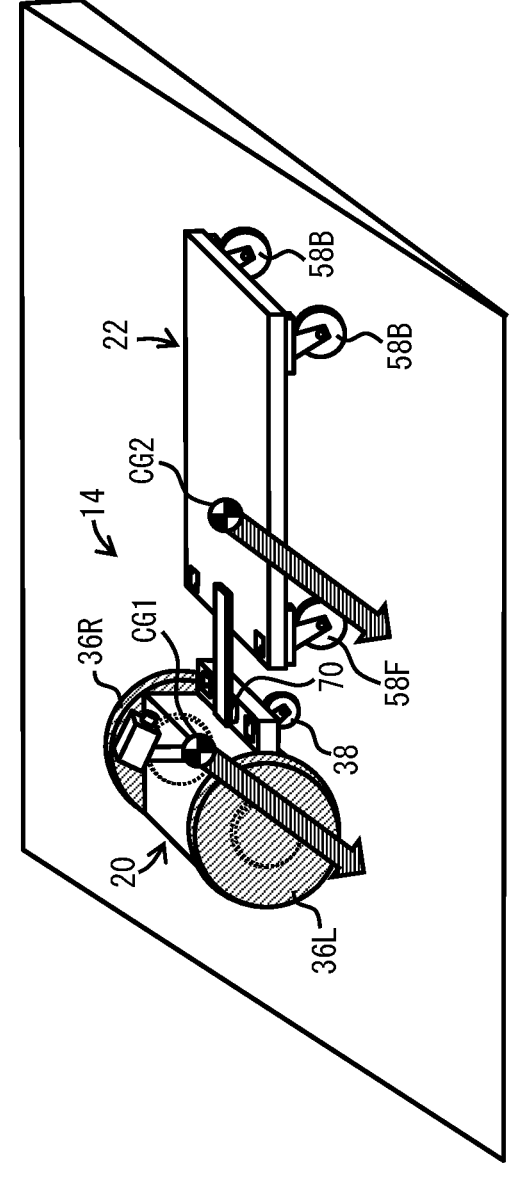
FIG. 6C is an illustration showing a jackknife phenomenon of an automated carrier 14 on a cant path.

For example, as shown in FIG. 6C, when the automated carrier 14 travels on a cant road (one-way grade), the jackknife phenomenon can also occur due to the force along the slope caused by gravity. Depending on the position of the center of gravity CG1 of the towing vehicle 20 and the center of gravity CG2 of the towed vehicle 22, a rotational moment is generated around the coupling 70, which can cause the automated carrier 14 to fold. Even in such a case, the control described above can suppress the folding of the automated carrier 14, which obstructs the travel of the automated carrier 14. The control described above can improve the driving stability of the automated carrier 14.

At S110 in FIG. 3, when the delivery task is completed (S110: Yes), proceeding to S112. In S112, the towing vehicle 20 disconnects the towed vehicle 22 and ends the process.

According to the embodiments described above, the driving stability of the automated carrier can be improved.

In the embodiment described above, there were two markers 45 for the towing vehicle 20 and two markers 65 for the towed vehicle 22, respectively. However, there may be one, or three or more markers 45 for the towing vehicle 20. There may be one, or three or more markers 65 for the towed vehicle 22. When the marker 45 for towing vehicle 20 or the marker 65 for the towed vehicle 22 is one, it may be the marker extending in the left-right direction of the vehicle. This allows the positional relationship between the towing vehicle and the towed vehicle to be identified in the marker images 80A-80C (see FIG. 4A-4C).

If the towing vehicle 20 and the towed vehicle 22 ride up on a step, some wheels fall into a ditch or the like, or are twisted, the size of the marker 45i, 65i change in the marker images 80A-80C (see FIG. 4A-4C). Therefore, the controller 24 of the towing vehicle 20 may detect changes in the height direction of the towing vehicle 20 and the towed vehicle 22 due to the events described above based on changes in the size of the marker 45i, 65i.

The invention claimed is:

1. An automated carrier comprising:
   a towing vehicle;
   a towed vehicle towed by the towing vehicle; and
   a coupling between the towing vehicle and the towed vehicle, the towing vehicle and the towed vehicle can rotate about the coupling with respect to each other,
   wherein the towed vehicle comprises a first marker associated with specification information of the towed vehicle stored in a computer mounted on the towing vehicle or in an external computer communicating with the towing vehicle,
   wherein the towing vehicle comprises a second marker,
   wherein the towing vehicle comprises a camera and a controller,
   wherein the camera acquires a marker image by capturing an area comprising the first marker on the towed vehicle and the second marker on the towing vehicle,
   wherein the controller acquires the specification information of the towed vehicle from the computer based on the marker image, and controls a drive unit of the towing vehicle based on the acquired specification information of the towed vehicle,
   wherein the controller acquires, based on a positional relationship between the first marker of the towed vehicle and the second marker of the towing vehicle in the marker image, a rotational direction and an angle of rotation between the towing vehicle and the towed vehicle in a rotation about the coupling, and wherein the controller controls the drive unit of the towing vehicle based on the acquired rotational direction and the acquired angle of rotation.

2. The automated carrier according to claim 1, wherein the specification information of the towed vehicle comprises at least one of a weight of the towed vehicle, a wheelbase of the towed vehicle, and whether caster wheels of the towed vehicle can be swiveled.

3. The automated carrier according to claim 1, wherein the first marker of the towed vehicle is associated with task information about a transport of the towed vehicle stored in the computer mounted on the towing vehicle or in the external computer communicating with the towing vehicle, the controller acquires the task information for the towed vehicle from the computer based on the marker image, and the controller controls the drive unit of the towing vehicle based on the acquired task information of the towed vehicle.

4. The automated carrier according to claim 1, wherein the towing vehicle is separable from the towed vehicle, the towing vehicle is configured to connect to the towed vehicle from a separated state from the towed vehicle by moving to the towed vehicle, the controller couples the towing vehicle to the towed vehicle by controlling the drive unit of the towing vehicle based on a positional relationship between the first marker of the towing vehicle and the second marker of the towed vehicle in the marker image.

* * * * *